United States Patent
Fenn et al.

(10) Patent No.: US 10,416,268 B2
(45) Date of Patent: Sep. 17, 2019

(54) MULTIPOLARIZED VECTOR SENSOR ARRAY ANTENNA SYSTEM FOR SEARCH AND RESCUE APPLICATIONS

(71) Applicant: Massachusetts Institute of Technology, Cambridge, MA (US)

(72) Inventors: Alan J. Fenn, Wayland, MA (US); Beijia Zhang, Cambridge, MA (US); Peter T. Hurst, Cambridge, MA (US); Kenneth E. Kolodziej, Lexington, MA (US); Larry L. Retherford, Merrimack, NH (US); Christian D. Austin, Medford, MA (US)

( * ) Notice: Subject to any disclaimer, the term of this patent is extended or adjusted under 35 U.S.C. 154(b) by 469 days.

(21) Appl. No.: 15/302,063

(22) PCT Filed: Apr. 13, 2016

(86) PCT No.: PCT/US2016/027269
§ 371 (c)(1),
(2) Date: Oct. 5, 2016

(87) PCT Pub. No.: WO2016/168285
PCT Pub. Date: Oct. 20, 2016

(65) Prior Publication Data
US 2018/0123238 A1    May 3, 2018

Related U.S. Application Data

(60) Provisional application No. 62/147,227, filed on Apr. 14, 2015.

(51) Int. Cl.
*G01S 3/36* (2006.01)
*G01S 3/32* (2006.01)
(Continued)

(52) U.S. Cl.
CPC ............... *G01S 3/36* (2013.01); *G01S 3/043* (2013.01); *G01S 3/14* (2013.01); *G01S 3/30* (2013.01);
(Continued)

(58) Field of Classification Search
CPC ... G01S 3/043; G01S 3/14; G01S 3/30; G01S 3/22; G01S 3/26; G01S 3/32; G01S 3/36;
(Continued)

(56) References Cited

U.S. PATENT DOCUMENTS 5,274,386 A   12/1993  Pellon
6,295,035 B1   9/2001  Holzheimer
(Continued)

FOREIGN PATENT DOCUMENTS

GB         2123214 A   *  1/1984   ............. H01Q 25/04

OTHER PUBLICATIONS

Appadwedula, et al.; "Direction-Finding Results for a Vector Sensor Antenna on a Small UAV;" Fourth IEEE Workshop on Sensor Array and Multichannel Processing; Jul. 12-14, 2006; pp. 74-78 (5 pages).
(Continued)

*Primary Examiner* — Cassi J Galt
(74) *Attorney, Agent, or Firm* — Daly, Crowley, Mofford & Durkee LLP

(57) ABSTRACT

The present disclosure is directed towards direction finding (DF) systems that can detect and locals a radio frequency (RF) signal (e.g. an emergency beacon) is two dimensions (i.e., azimuth and elevation). In one embodiment, a DF system comprises an array of multipolarized loop antennas coupled to a beamformer which provides monopole, dipole, and loop antenna element modal signals. The DF system may also comprise a multi-channel digital receiver system coupled to the beamformer. The multi-channel digital receiver system is configured to receive modal signals
(Continued)

provided thereto from the beamformer which can be used for accurate two-dimensional geolocation of RF signals including, but not limited to, location of RF emergency beacon sources.

14 Claims, 13 Drawing Sheets

(51) Int. Cl.
*G01S 3/04* (2006.01)
*G01S 3/14* (2006.01)
*H01Q 25/02* (2006.01)
*H01Q 7/00* (2006.01)
*G01S 3/30* (2006.01)
*H01Q 3/40* (2006.01)

(52) U.S. Cl.
CPC ............... *G01S 3/32* (2013.01); *H01Q 3/40* (2013.01); *H01Q 7/00* (2013.01); *H01Q 25/02* (2013.01)

(58) Field of Classification Search
CPC .. H01Q 3/2629; H01Q 3/40; H01Q 25/02–04; H01Q 7/00; H01Q 21/205
See application file for complete search history.

(56) References Cited

U.S. PATENT DOCUMENTS

| | | | |
|---|---|---|---|
| 6,535,180 | B1 | 3/2003 | Gregorwich et al. |
| 6,987,489 | B2 | 1/2006 | Melconian et al. |
| 7,292,195 | B2 * | 11/2007 | Phillips .................. H01Q 7/00 343/744 |
| 7,505,009 | B2 | 3/2009 | Parsche et al. |
| 7,978,139 | B2 | 7/2011 | Robinson et al. |
| 10,211,531 | B2 * | 2/2019 | Galejs .................. G01S 3/143 |
| 2008/0231517 | A1 | 9/2008 | Zheng |
| 2010/0124263 | A1 | 5/2010 | Martin et al. |
| 2010/0277363 | A1 | 11/2010 | Kainulainen et al. |
| 2014/0176373 | A1 | 6/2014 | Crouch et al. |

OTHER PUBLICATIONS

Levesque; "The COSPAS-SARSAT System;" IEEE Colloquium on Satellite Distress and Safety Systems; Jan. 25, 1993; pp. 3/1-3/4 (4 pages).

Mir, et al.; "Calibration of a Polarization Diverse Array;" 2006 IEEE International Conference on Acoustics, Speech, and Signal Processing, vol. 4; May 14-19, 2006; pp. IV 1065-IV 1068 (4 pages).

Mir, et al.; "Passive Direction Finding Using Airborne Vector Sensors in the Presence of Manifold Perturbations;" IEEE Transactions on Signal Processing, vol. 55, Issue 1; Dec. 19, 2006; pp. 156-164 (9 pages).

Mir; "Transfer Function Based Approaches to Array Calibration;" Journal of Communications, vol. 2, No. 3; May 1, 2007; pp. 58-63 (6 pages).

Nehorai; "Vector-Sensor Array Processing for Electromagnetic Source Localization;" IEEE Transactions on Signal Processing, vol. 42, Issue 2; Aug. 6, 2002; pp. 376-398 (23 pages).

Nicolau, et al.; "Performance of TOA and FOA-Based Localization for COSPAS-SARSAT Search and Rescue Signals;" 2013 IEEE 5$^{th}$ International Workshop on Computational Advances in Multi-Sensor Adaptive Processing; Dec. 15-18, 2013; pp. 312-315 (4 pages).

Pine, et al.; "Radio Direction Finding for Maritime Search and Rescue;" 5$^{th}$ Asian Control Conference, vol. 2; Jul. 20-23, 2004; pp. 723-730 (8 pages).

Schmidt; "Multiple Emitter Location and Signal Parameter Estimation;" IEEE Transaction on Antennas and Propagation, vol. 34, Issue 3; Jan. 6, 2003; pp. 276-280 (5 pages).

Zurabov, et al.; "COSPAS-SARSAT Satellite System;" Third International Conference on Satellite Communications, vol. 1; Sep. 22-24, 1998; pp. 156-158 (3 pages).

PCT Search Report of the ISA for Intl. Appl. No. PCT/US2016/027269 dated Sep. 30, 2016; 4 pages.

PCT Written Opinion of the ISA for Int'l Appl. No. PCT/US2016/027269 dated Sep. 30, 2016; 6 pages.

PCT International Preliminary Report on Patentability dated Oct. 26, 2017 from International Application No. PCT/US2016/027269; 8 Pages.

* cited by examiner

Monopole Mode

Loop 1 Mode

Loop 2 Mode

MULTIPOLARIZED VECTOR SENSOR ARRAY ANTENNA SYSTEM FOR SEARCH AND RESCUE APPLICATIONS

CROSS REFERENCE TO RELATED APPLICATIONS

This application is a U.S. National Stage of PCT application PCT/US2016/027269 filed in the English language on Apr. 13, 2016, and entitled "MULTIPOLARIZED VECTOR SENSOR ARRAY ANTENNA SYSTEM FOR SEARCH AND RESCUE APPLICATIONS" which claims the benefit under 35 U.S.C. § 119 of provisional application No. 62/147,227 filed Apr. 14, 2015, which application is hereby incorporated herein by reference.

STATEMENT REGARDING FEDERALLY SPONSORED RESEARCH

This invention was made with Government support under Contract No. FA8721-05-C-0002 awarded by U.S. Air Force. The Government has certain rights in the invention.

BACKGROUND

As is known in the art, direction finding (DF) of radio frequency (RF) signals (e.g. RF beacon signals) can be determined by triangulation using antenna systems on satellites, aircraft, and ships. Current DF systems typically perform time-consuming triangulation calculations to provide only one-dimensional bearing information. Thus, current DF systems can take many minutes or hours to turn line-of-bearing data into global position data.

SUMMARY

In one aspect, the present disclosure is directed towards an electromagnetic field vector sensing system. In some embodiments, the system includes a multipolarized array of co-located loop antenna elements coupled to a beamformer (also referred to as a modeformer) which processes signals provided thereto from the antenna elements to generate modal signals. In an embodiment, such modal signals may be suitable for use in a direction finding (DF) system. Such a DF system, may be used, for example, to provide instantaneous two-dimensional (2D) direction finding of radio frequency (RF) signals.

The systems described herein may include one or more of the following features independently or in combination with another feature.

In embodiments, the electromagnetic field vector sensing system provides calibrated amplitude and phase radiation patterns with monopole, dipole, and loop modes generated from the plurality of loop antennas.

In embodiments, the plurality of loop antennas in the electromagnetic field vector sensing system may include two or more crossed loop antennas.

In embodiments, the electromagnetic field vector sensing system is configured to locate a 2D position of a source of one or more RF beacon signals.

In an embodiment, the electromagnetic field vector sensing system described herein can be used to detect and substantially instantaneously geolocate emergency beacon signals.

In general, the concepts, systems and techniques described herein may be used in a variety of different applications, including but not limited to, airborne or ground-based search and rescue for detection of emergency beacon signals.

Search and rescue (SAR) systems often require airborne sensors that receive and locate emergency RF beacon signals. In an embodiment, a receive antenna system provided is accordance with the concepts described herein and provided as part of such airborne sensors, forms a portion of an instantaneous DF vector sensor system. Such an antenna system (or an entire DF system) may be installed on various platforms (e.g., an airborne platform, a ground-based platform, or a water-based platform) to detect and locate an RF beacon in two dimensions (e.g., azimuth and elevation) in a single "look."

In some embodiments, the DF system can rapidly detect and locate the RF beacon in two dimensions (e.g. in less than 45 milliseconds). Such rapid detection and geolocation capability may result in a SAR operator receiving a substantially instantaneous result (e.g., a location of a source of a beacon or other signal). The beamformer can be coupled to a receiver having receiver channels adapted to operate over a plurality of different frequency bands. In SAR applications, for example, the system can operate over both a 406 MHz frequency band and a 121.5 MHz frequency band corresponding to the current and legacy MHz emergency beacon bands, respectively. The 406 MHz beacons include Personal Locator Beacons (PLBs) for land applications and Emergency Position Indicating Radio Beacons (EPIRBs) for marine applications.

In one aspect, the present disclosure is directed towards a DF system comprising an array antenna (or more simply, "an array") of multipolarized loop antennas disposed above a ground plane. The loop antennas are coupled to a beamformer which receives signals provided thereto from the loop antennas and provides beamformer output signals corresponding to monopole, dipole, and loop antenna element mode signals (also sometimes referred to herein as beamformer output signals). The array and beamformer may operate in receive or transmit signal paths of a DF system.

In an embodiment, a receive signal path of a DF system further comprises a multi-channel digital receiver system coupled to receive signals from the beamformer.

In an embodiment, the multi-channel digital receiver system may operate on one or more modal signals (monopole, dipole and loop mode signals) appropriate for use to provide accurate two-dimensional (2D) geolocations of RF sources such as emergency beacon RF sources.

The monopole, dipole, and loop antenna element modes axe generated by performing a beamforming operation on RF signals received by the array of multipolarized loop antennas. In one illustrative embodiment, the array of loop antennas may be provided as an array of wire loop antennas, with each wire loop antenna having a height over a ground plane that is approximately one-quarter wavelength at the highest operating frequency. In some embodiments, each of the wire loop antennas can have a circular cross section diameter approximately 0.003 wavelengths at the highest operating frequency of the receiving array antenna system. In other embodiments, different loop antenna implementations may (i.e. other than wire loop antennas) be used.

In some embodiments, the loop antennas nay be comprised at least one of: a metallic electrical conducting wire, rod, or a strip material such as aluminum, brass, or copper. The loop antennas may preferably form a collocated array of antenna elements with common phase centers. In some embodiments, the loop antennas are disposed over a ground plane. In some embodiments, the ground plane has a diameter ranging from about 15 cm to about 30 cm for operation in the 121.5 MHz to 406 MHz band.

In an embodiment, a beamformer comprises one or more 0°/180° couplers (e.g. hybrid magic tee couplers) feat provide sum and difference signal outputs is response to signals provided thereto from the loop antennas.

In some embodiments, the beamformer is formed or otherwise provided on a printed circuit board, and each of the loop antennas may be mechanically and/or electrically coupled to the printed circuit board using a retainer that comprises a conical threaded split ferrule and a compression nut. The compression nut can squeeze the split ferrule closed to make both mechanical and electrical contacts to each of the loop antennas.

In some embodiments, the DF system has a digital receiver coupled to receive signals from one or more outputs of the beamformer. In some embodiments, the digital receiver system may be configured to selectively operate over two or more frequency bands.

In one illustrative embodiment, the receiving array antenna system can be configured to geolocate emergency beacon signals in the 121.5 MHz band and 406 MHz band. In some embodiments, the receiving array antenna system is configured to geolocate at least one of: an avalanche beacon (e.g. a beacon signal having a frequency of about 457 KHz), a personal locator beacon for land applications (e.g. a beacon signal having a frequency of about 406 MHz), and an emergency position indicating radio beacon (EPIRB) for marine applications.

The array antenna may be mounted in any of a variety of different locations depending upon the needs of a particular application. Such locations include, but are not limited to: an aircraft fuselage, a satellite, a tower, a building, a stationary ground vehicle, a moving ground vehicle, a ship, or a personal pack (e.g. including, but not limited to, a fanny-pack, a backpack, a pocketbook).

In some embodiments, the array antenna can be configured to compensate or otherwise account for scattering from surrounding structures including but not limited to aircraft, satellite, tower, building, ground vehicle, ship, or backpack.

In one illustrative embodiment, a receiving array antenna system can be calibrated by transmitting a known RF signal from a known RF source and measuring the signal amplitude and phase received by each of the loop, dipole, and monopole antenna modes in the receiving array antenna system. In some embodiments, the receiving array antenna system can be calibrated by transmitting from a known radio frequency source and calculating amplitude and phase of signals received by each of the loop, dipole, and monopole antenna modes using electromagnetic simulations.

In another aspect, the present disclosure is directed towards a DF system comprising a multipolarized array antenna provided from a plurality of loop antenna elements. The system may further comprise a beamformer coupled to receive signals from the multipolarized antenna array. The beamformer comprises a plurality of RF coupler components and in response to signals provided thereto, the beamformer generates one or more beamformer output signals (or modal signals or mote simply modes) which correspond to particular amplitude and phase radiation patterns of the multipolarized loop antenna array.

In some embodiments, the beamformer can be configured to generate monopole, dipole, and loop antenna element modes. The DF system may further comprise a multi-channel digital receiver system coupled to the beamformer. The multi-channel digital receiver system can be configured to receive and process a plurality of modal signals provided thereto from the beamformer. In one illustrative embodiment, the DF system beamformer can generate six (6) modes each of which are provided to a corresponding channel of a six (6) channel digital receiver. The receiver digitizes the received signals and the signal processor processes the signals provided thereto and uses the accurate two-dimensional geolocation of emergency beacon radiofrequency sources.

In embodiments, the beamformer may be provided from a plurality of coupler components (e.g. magic tee coupler components) configured to provide sum and difference signal outputs. In an embodiment, pairs of loop antennas may be coupled to pairs of couplers to form a desired one of monopole, dipole and loop antenna modes with which DF and geolocation functions may be performed.

It should be appreciated that elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

BRIEF DESCRIPTION OF THE DRAWINGS

The foregoing concepts and features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the concepts, systems and techniques described herein. Like numbers is the figures denote like elements.

DETAILED DESCRIPTION

The present disclosure is directed towards systems that can detect and locate a radio frequency (RF) target (e.g., an emergency beacon, such as an RF beacon) in two dimensions (e.g., azimuth and elevation). The system may be an instantaneous direction finding (DF) vector sensor system that can be used in a variety of applications including, but not limited to search and rescue (SAR) operations. SAR operations often involve detecting and locating a beacon signal generated by a device carried by a person or on a vehicle. SAR applications may include skiing, mountain climbing, hiking, boating, and other applications where emergencies can arise. Common RF beacon frequencies include 457 kHz (avalanche beacon (AB)) and 406 MHz (personal locator beacons (PLBs) for land applications, Emergency Position Indicating Radio Beacons (EPIRBs) for marine applications). For example, PLBs and EPIRBs transmit a 406 MHz beacon signal to a satellite, which, by itself, only allows position accuracy to within about 2 miles. PLBs also generate a 121.5 MHz continuous wave (CW) tone which is used as a homing signal. Some PLBs and EPIRBs have added GPS signals to allow position accuracy to within about 100 meters. In some locations, GPS signals are blocked due to surrounding obstacles.

In an embodiment, the present disclosure is a search and rescue (SAR) system that provides 2D azimuth and elevation DF data on a received beacon signal. Many current technologies only provide 1D azimuth (bearing) DF which forces search and rescue crews to perform time-consuming triangulation. Thus, the concepts, systems and technologies described herein provide many advantages over other technologies. For example, in some embodiments, the DF systems described herein can provide ±1° angle of arrival measurement accuracy. Further, the DF systems described herein, can provide substantially instantaneous (e.g., approximately 45 ms) direction finding capability. Finally, the DF systems described herein can provide such capabilities in a compact volume.

Figure 1:
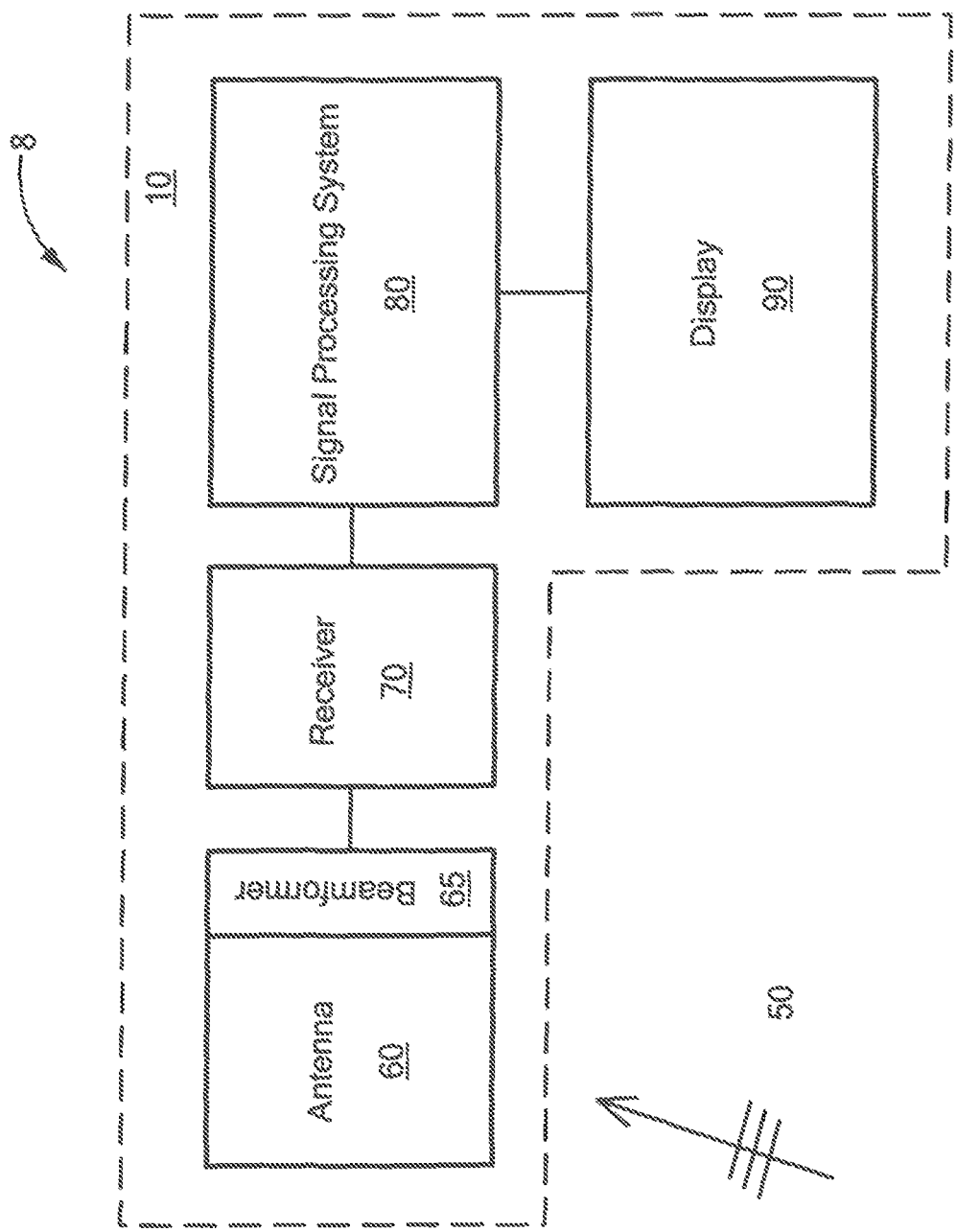
FIG. 1 is a block diagram of components of an antenna system.

Now referring to FIG. 1, a DF system 8 has a receive path 10 which includes one or more antennas 60 coupled to a beamformer 65. In an embodiment, the DF systems described herein can utilize various antenna designs, such as electrically thin or thick tubular monopoles or dipoles, Vivaldi flared notch radiators, log-periodic antennas, spiral antennas, helical antennas, waveguide antennas, and other antenna radiators having either narrowband or wideband characteristics. One illustrative system described herein utilizes loop antenna elements. Beamformer 65 operates on the signals provided thereto from antennas 60 and forms beamformer signals at one or more outputs thereof. The beamformer outputs are coupled to a receiver 70. Receiver 70 may be provided as & multichannel digital receiver which processes the signals provided thereto (e.g., via one or more downconverter circuits and/or amplifier circuits) and provides the so-processed signals to a signal processing system 80. Signals processing system 80 further processes the signals and provides output angle-of-arrival information to a display unit 90 (e.g. for observation by a user).

In some embodiments, the antenna 60 may be provided as a multipolarized array antenna having N co-located antenna elements. In one illustrative embodiment, antenna 60 may comprise up to six co-located antenna elements (e.g., up to sis (6) wire loop antenna elements). In other embodiments, fewer or greater than six antenna elements may be used. Those of ordinary skill in the art will appreciate how to select a particular number and type of antenna element for use in a particular application.

The one or more antennas 60 (e.g., antenna array) can be mounted on a variety of different air-based, ground-based, or water-based platforms, including but not limited to, an aircraft, ship, tower, ground vehicle or satellite.

In an embodiment, the antenna 60 can be configured to receive a beacon signal 50. The beacon signal 50 may be an RF signal generated (transmitted) or otherwise emitted from a beacon device. Such a beacon device may, for example, be carried by a person or disposed on a stationary or moving platform (e.g. disposed on a vehicle). For example, in an emergency, the beacon device can be activated and transmits a signal that is received by antenna 60 and provided to beamformer 65 which forms or otherwise provides modal signal in response to signals provided thereto from antenna 60. In an embodiment, the system 8 may have an operating frequency range from about 121.5 MHz to about 406 MHz. In other embodiments, the system may operate over the frequency range of about 450 kHz to about 500 MHz. The system may, of course, operate over any desired frequency range by appropriate selection/design of antenna 60 and beamformer 65.

The antenna 60 may be coupled (e.g., directly coupled or communicatively coupled) to the beamformer 65, such that RF signals received by the antenna 60 are coupled or otherwise provided to the beamformer 65. The beamformer 65 receives the RF signals provided thereto and, as will be described in detail further below, operates on the signals to generate one or more beamformer output modal signals (or more simply, "modes"). The beamformer output modes are thus resultant from arithmetic (sum and difference) operation performed by beamformer components on signals provided thereto from two or more antenna elements which make up antenna 60. In some embodiments, such individual antenna elements may be coupled to input ports of the beamformer. The beamformer generated modes may be based upon an arrangement or configuration of the antenna 60 and/or beamformer components (e.g., arrangement of couplers in the beamformer 65), as will be discussed in greater detail below.

Receiver 70 is disposed to receive signals from the output of beamformer 65. In some embodiments, the receiver 70 includes digital receiver channels that are configured to filter, down convert and digitize RF signals provided thereto. Receiver 70 provides appropriately processed signals to the signal processing system 80. In an embodiment, the signal processing system 80 can processes the digitized data. The signal processor system 80 may use on-board global positioning system (GPS) and inertial navigation system (INS) data to determine a positon of the beacon which emitted the signal received by system 8. The signal processing system 80 is communicatively coupled to a display unit 90. In an embodiment, the display unit 90 may receive signals indicative of the position of the beacon and display such signals to a user via such visual display (e.g. such as on a digital map to indicate the determined location of the beacon).

The antenna 60 may have a plurality of orthogonally disposed antenna elements. Such antenna elements may result in a plurality of orthogonal dipole modes and a plurality of orthogonal loop modes. In some embodiments, one antenna element provided as part of antenna 60 may be provided as a dipole and may include two monopole segments. A monopole disposed over an electrically conducting ground plane has radiation pattern characteristics similar to a dipole element. Thus, in response to reception of a beacon signal 50, antenna 60 and beamformer 65 provide unique antenna pattern amplitude and phase distributions effective in forming a signal correlation matrix that contains the beacon's direction of arrival information. In the case where N vector antenna modes are formed by the beamformer 65, the signal correlation matrix is a N×N square matrix. The mnth matrix element of the signal correlation matrix is computed from the product of the complex signal voltage received in the mth beamformer mode to the complex conjugate of the signal voltage received in the nth beamformer mode.

It should be appreciated that the number of vector antenna modes and types of modes may vary based upon an arrangement or design of the antenna elements comprising the antenna 60. For example, and as will be described further below, in some embodiments, the antenna 60 may be provided from a plurality of co-located wire loop antennas including a crossed wire loop antenna. Such an arrangement may provide up to six simultaneous operating modes including an omnidirectional monopole mode, three loop directional loop modes, and two dipole modes.

Figure 2:
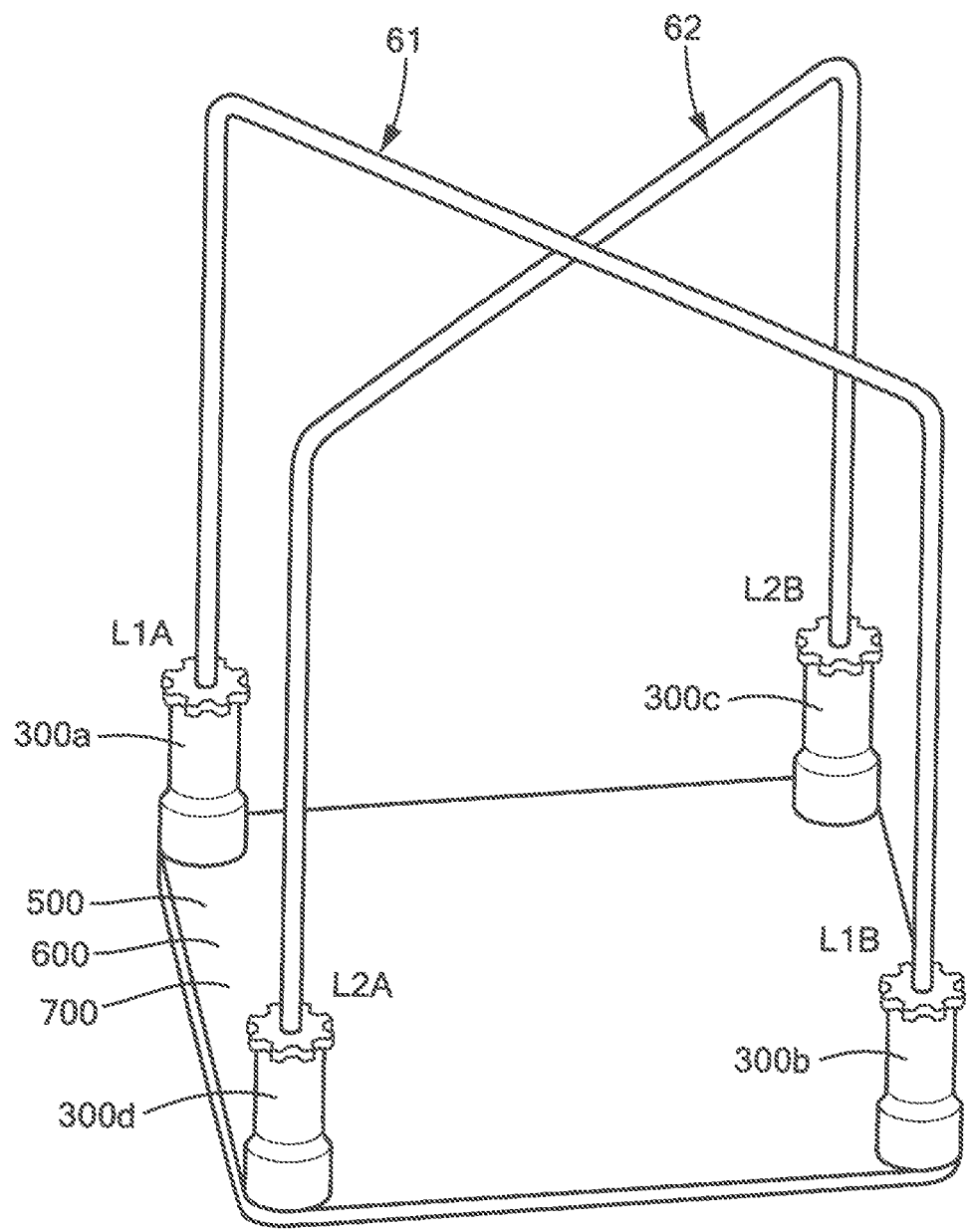
FIG. 2 is an isometric view of a vector sensing antenna having two crossed wire loop antennas that are connected by means of four retainers to a ground plane corresponding to a first surface of a printed circuit board beamformer circuit.

Now referring to FIG. 2, in one illustrative embodiment, a DF system includes a pair of orthogonally disposed loop antennas 61, 62 coupled to a beamformer 700. In the illustrative embodiment of FIG. 2, the two loop antennas 61, 62 are arranged m a vertically oriented crossed loop pattern above a ground plane 500. In this illustrative embodiment, the beamformer 700 is implemented as a printed circuit board (PCB) 600 and ground plane 500 may be provided as a surface of the PCB.

In an embodiment, the loop antennas 61, 62 are provided as wire loop antennas coupled to beamformer 700 using a plurality of retainers 300a-300d. For example, each end of the wire loop antennas 61, 62 (two ends per wire loop antenna) may be disposed in a respective one of retainers 300a-300d to both mechanically secure antennas 61, 62 to PCB 600 and to electrically couple the wire loop antennas 61, 62 to the beamformer 700. Thus, in this illustrative embodiment, in a receive mode of operation, beamformer 700 is configured to receive input signals from wire loop antennas 61, 62 and in response, thereto, to provide beamformer mode signals at outputs thereof (beamformer outputs not visible in FIG. 2).

Figure 3B:
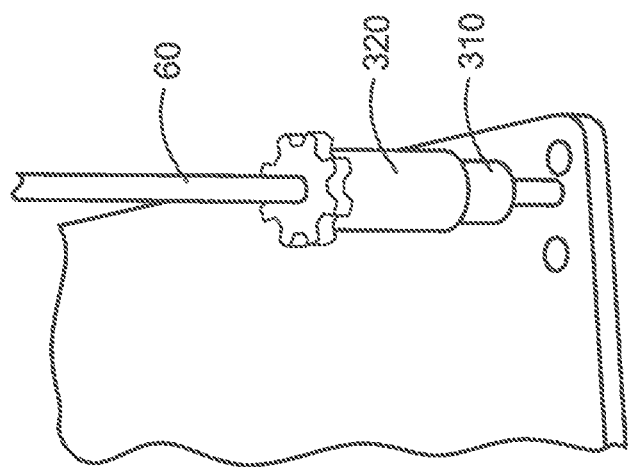
FIGS. 3-3B are a series of isometric views showing the assembly of a split ferrule and compression nut to connect a wire loop antenna to s beamformer.
Figure 3A:
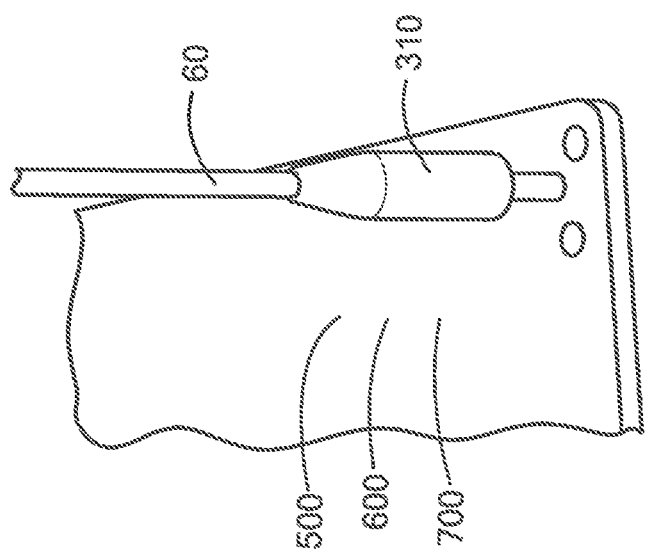
Figure 3:
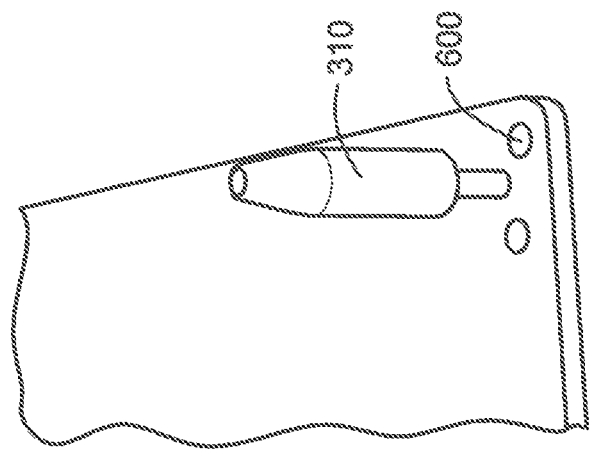

Now referring to FIGS. 3-3B, in which like reference numerals denote like elements throughout the several figures, a retainer 310 is mechanically and electrically coupled (e.g. by being soldered or otherwise conductively coupled) to ground plane 500 (which here corresponds to a first surface of a printed circuit board 600). In an embodiment, the retainer 310 may be provided as a conical threaded split ferrule. An end of a loop antenna (e.g. loop antenna 61 or 62) can be inserted into the retainer 310 to secure the loop antenna to beamformer 700. In an embodiment, the ground plane may have a diameter ranging from about 15 cm to about 30 cm for operation in the 121.5 MHz to 406 MHz band.

In an embodiment, the loop antenna 60 can readily be removed and reinstalled as seeded from the retainer 310 (and thus the beamformer 700). For example, a plastic compression nut 320 may be coupled around the end of the loop antenna 60 and the retainer 310. The plastic compression nut 320 squeezes the retainer 310 closed, which provides both mechanical and electrical contact with the end of the loop wire 60. Other techniques for securing antennas 60, 61 to beamformer 700 may, of course, also be used.

Referring back to FIG. 2, in the illustrative embodiment of FIG. 2, wire loop antennas 61, 62 include two vertical sections extending from a surface of the beamformer and a horizontal section coupling two ends of the vertical sections together. Each antenna section may have the same dimensions. For example, in one embodiment for operation at emergency beacon frequencies, each section may have a length of 17.78 cm and a wire diameter of 0.236 cm. In other embodiments, one or more sections may have different dimensions. It should be appreciated however that the dimensions of the each section and the wire loop antennas 61, 62 may vary according to a desired operating frequency of a DF system (e.g., 457 kHz AB, 406 MHz PLBs, 121.5 MHz CW, etc.).

In some embodiments, the length of the loop sections may be designed such that it is on the order of one-quarter wavelength of a highest operating frequency of a DF system. For example, wire loop antennas 61, 62 may have a circular wire cross section diameter approximately 0.003 wavelengths at the highest operating frequency of a DF system. The direction finding system may have ultra-wideband radiation pattern characteristics, such that as the frequency is lowered the radiation pattern shape (both amplitude and phase) remains essentially constant (frequency independent). It should be appreciated that wire loop antenna 61, 62 provide one embodiment, and that loop antennas described herein may have a variety of different dimensions (e.g., lengths, widths) based upon the needs and requirements of a particular application of a direction finding system.

Figures 4, 4A:
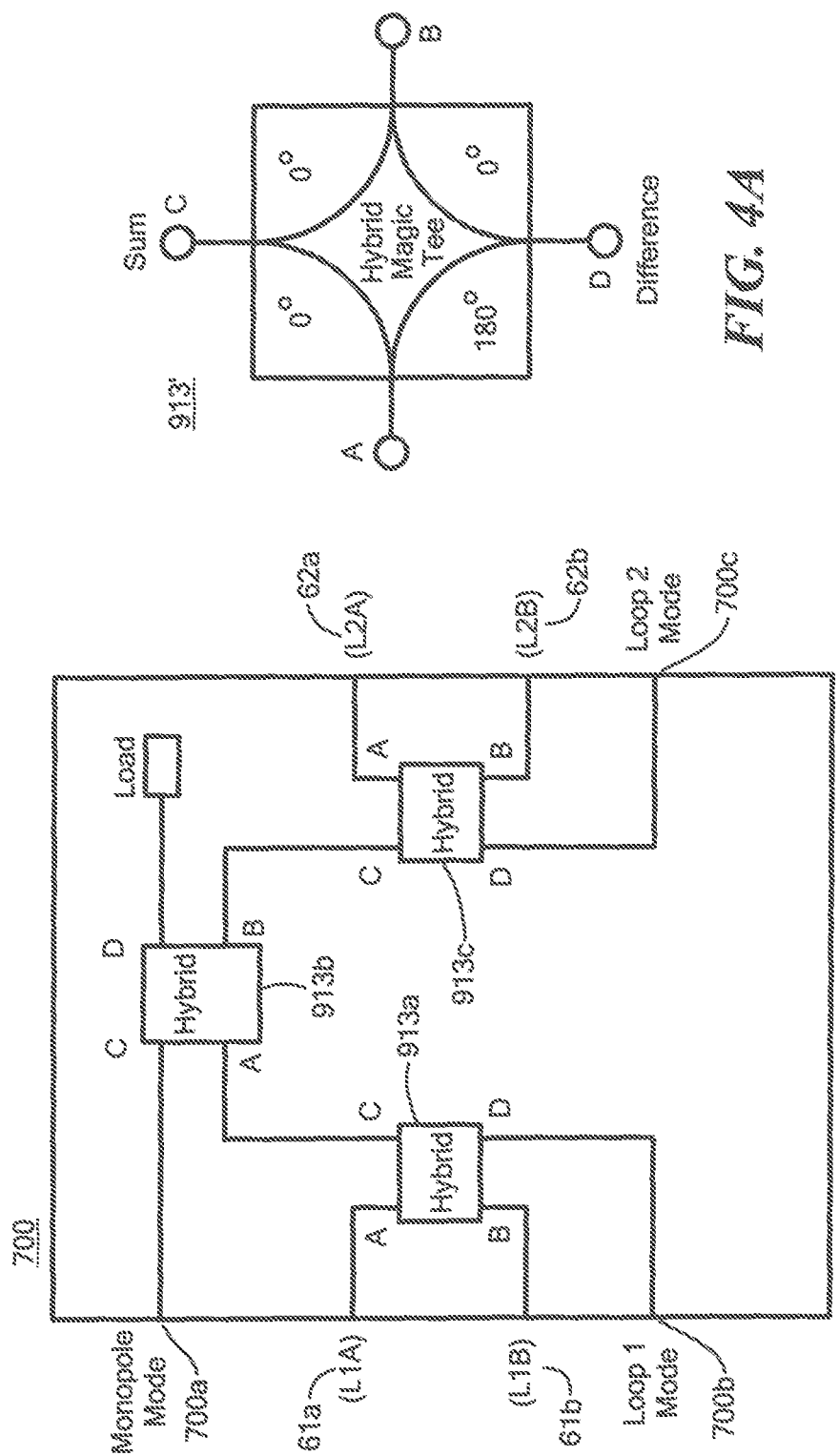
FIG. 4 is a schematic diagram of a beamformer having three sum and difference magic tee components for a vector sensing antenna with crossed loop modes 1 and 2 and a monopole mode.
FIG. 4A is a schematic diagram illustrating a phase relationship between ports of a magic tee component.

Now referring to FIG. 4, a beamformer 700, which may be the same as or similar to the type used in the system of FIG. 2, is pro vided from three couplers 913a-913c. It should be appreciated that although in this illustrative embodiment the couplers 913a-913c are shown provided as hybrid magic tee (sum and difference) couplers, any circuit component (or combination or circuit components) which provide the same function as a hybrid magic tee coupler may, of course, also be used. The ports of couplers 913a-913c are designated as A, B, C, and D.

Briefly, and referring now to FIG. 4A, an illustrative diagram of a hybrid magic tee coupler 913' is shown. In this illustration, hybrid magic tee coupler port C and port D are 180° out of phase. Thus, a signal provided to port A of the magic tee 913' is divided equally and ideally appears at ports C and D with equal amplitude, but 180° out of phase.

Similarly, a signal fed to port B is divided and (ideally) appears at ports C and D with equal amplitude and equal phase. Similarly, a signal fed to port C is divided equally and in phase between ports A and B and a signal fed to port D is divided equally and 180° out of phase between ports A and B. Thus, the C port is designated as the sum port since signals provided to ports A and B, are summed at port C; that is, C=A+B and the D port is designated as the difference port since signals provided to ports A and B are subtracted at port D, that is, D=B−A.

Conversely, a signal incident, on port C (i.e., designated sum port) splits equally in amplitude between ports A and B, and the resulting signals are in phase. However, a signal incident on port D (i.e., difference port) splits equally in amplitude between ports A and B, but the resulting signals are 180 degrees out of phase.

Referring again to FIG. 4, couplers 913a, 913c each have a pair of input ports coupled to respective ends 61a, 61b, 62a, 62b (FIG. 2) of first and second loop antennas 61, 62 (FIG. 2). In FIG. 2, ends 61a, 61b of the first loop antenna 61 are designated L1A and L1B, and the ends 62a, 62b of the second loop antenna 62 are designated L2A and L2B. In this arrangement, the couplers 913a, 913c operate on the signals provided thereto from antennas 61, 62 to generate a monopole mode (via the sum port of coupler 913b) at beamformer port 700a and two orthogonal loop modes (loop 1 mode and loop 2 mode) at respective ones of beamformer ports 700b, 700c.

Figure 5:
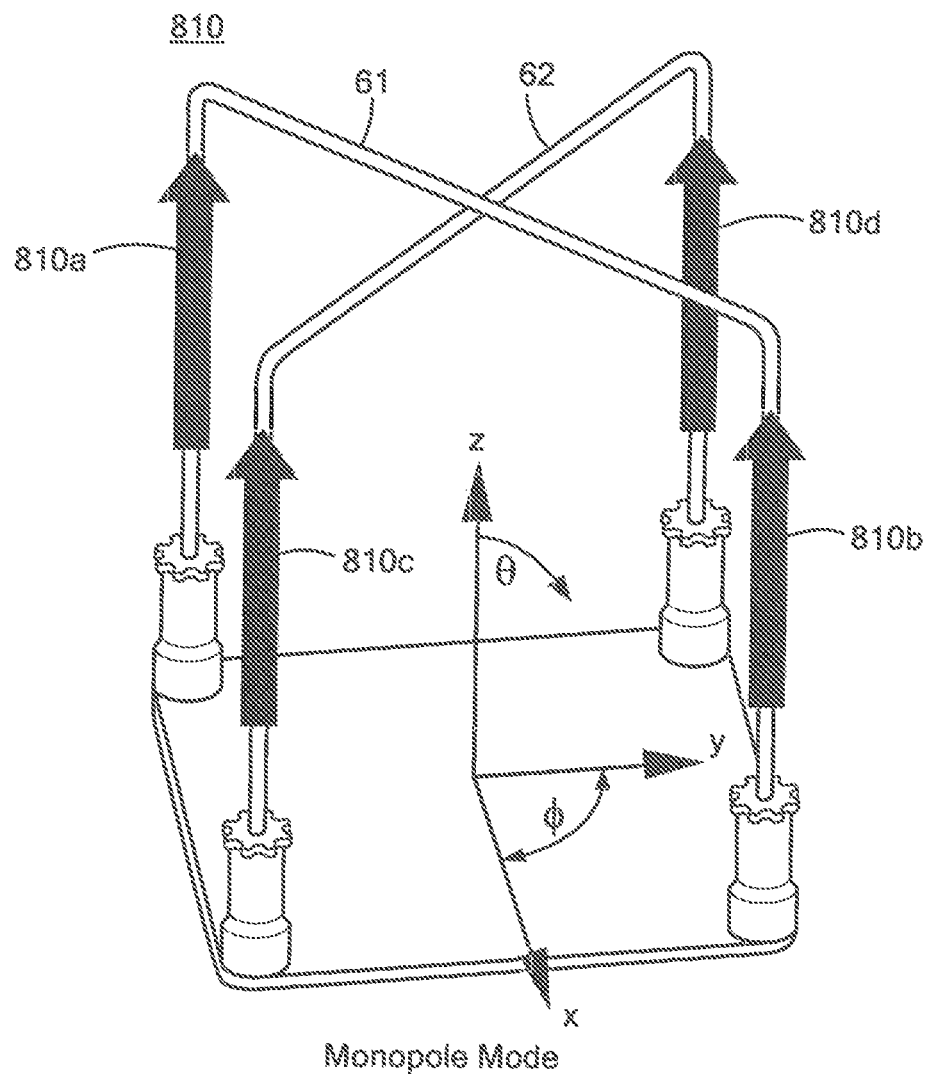
FIG. 5-5B are a series of schematic diagrams illustrating electric currents and corresponding radiation patterns for a vector sensing antenna with a monopole mode (FIG. 5), and crossed loop modes 1 and 2 (FIGS. 5A and 5B)
Figure 5:
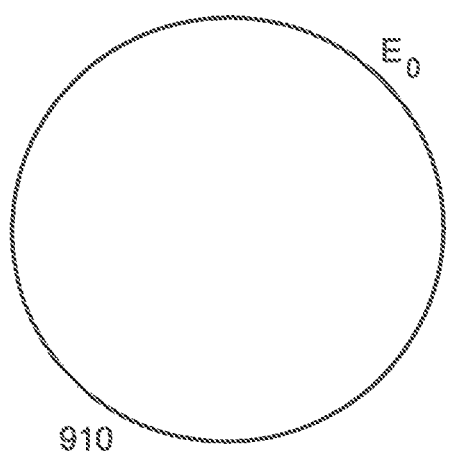
Figure 5A:
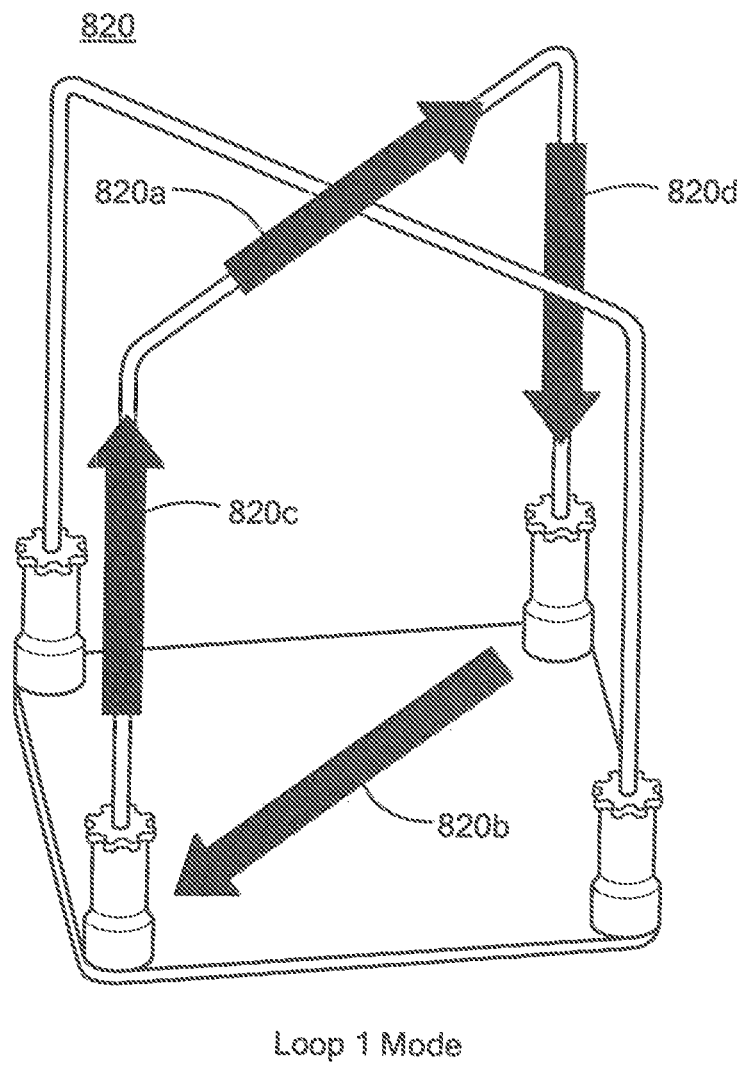
Figure 5A:
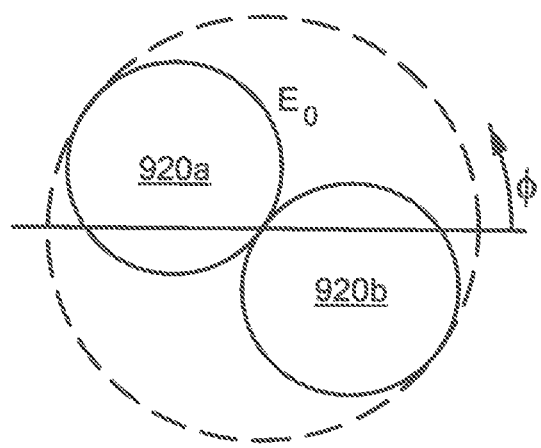
Figure 5B:
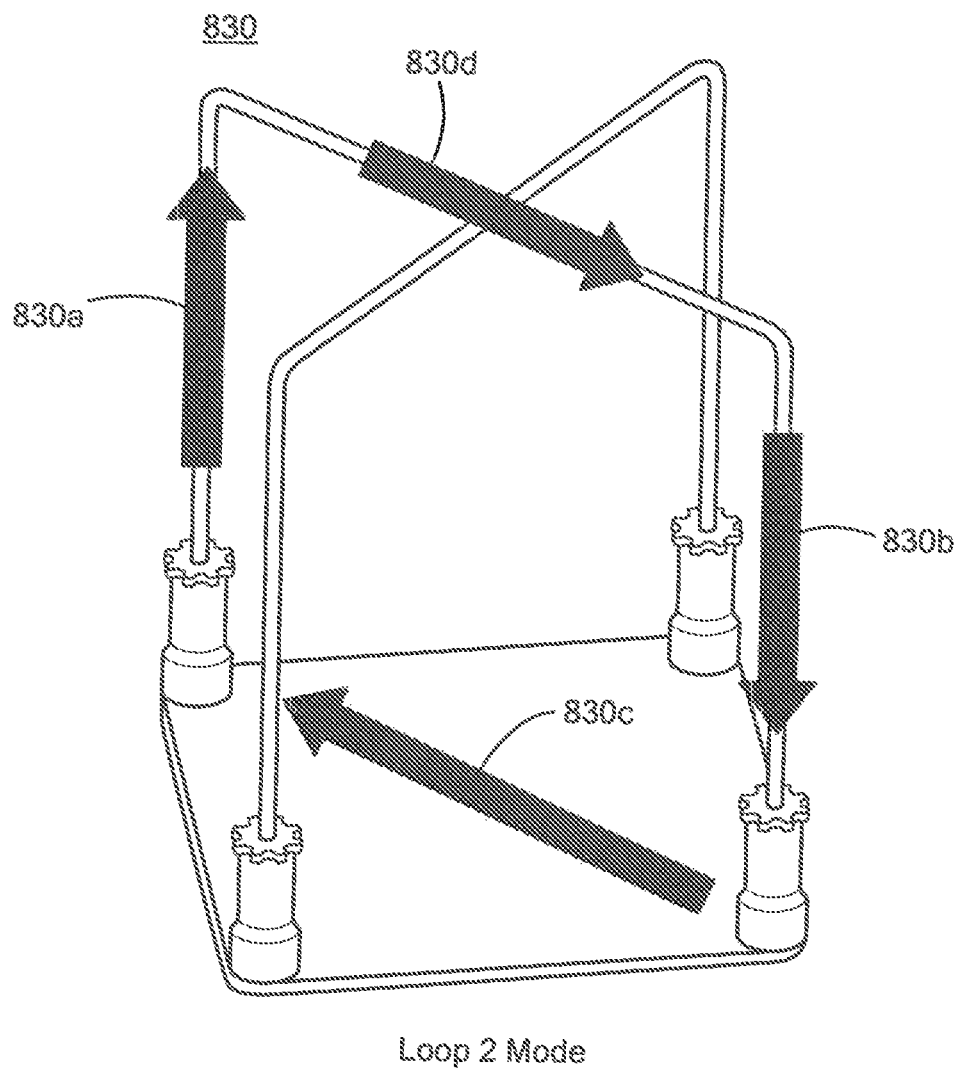
Figure 5B:
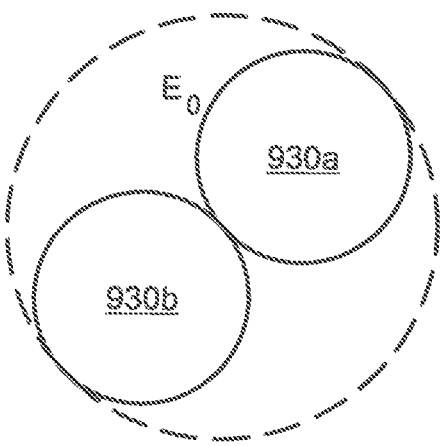

Referring now to FIGS. 5-5B, schematic diagrams of a pair of orthogonally disposed loop antennas illustrated currents for a monopole mode (FIG. 5) and two orthogonal loop current modes (or more simply loop modes) 820 (FIG. 5A), 830 (FIG. 5B) as well as the corresponding amplitude radiation patterns 910 (FIG. 5), 920a-920d (FIG. 5A), 930a-930d (FIG. 5C), respectively. The standard spherical coordinates of the electric field vector theta ($E_\theta$) component are also shown. In the monopole mode 810, each loop antenna element 61, 62 carries electric currents 810a-810d in equal amplitude and phase. Therefore when electric currents 810a-810d are summed in a beamformer (e.g. beamformer 700 of FIG. 4), an omnidirectional amplitude and phase radiation pattern 910 is produced in the xy-plane.

In the first loop mode 820, electric currents 820a, 820b, 820c, and 820d are equal in amplitude and phase, and when they are summed in a beamformer (e.g. beamformer 700 of FIG. 4), they produce a directional amplitude radiation pattern having two lobes 920a, 920b in the xy-plane with the patterns having peak amplitudes at $\phi=135°$ and $\phi=-45°$ and suits at $\phi=45°$ and $\phi=-135°$. In the first loop mode 820, the two lobes 920a, 920b have a 180-degree phase difference between them.

In the second loop mode 830, electric currents 830a, 830b, 830c, and 830d are equal in amplitude and phase, and when they are summed in the beamformer 700 (of FIG. 4), they produce a two-lobe directional amplitude radiation pattern 930a, 930b in the xy-plane with patterns peaks at $\phi=45°$ and $\phi=-135°$ and nulls at $\phi=135°$ and $\phi=-45°$. In the second loop mode 830, the two lobes 930a, 930b have a 180-degree phase difference between them. In an embodiment, the radiation pattern characteristics are essentially frequency independent as the frequency is lowered from the maximum frequency (406 MHz) where the antennas are near resonant length. Thus, the multipolarized antennas can have a constant radiation pattern performance over a desired frequency band including, but not limited to, the emergency beacon frequency range of 457 kHz to 406 MHz.

Figure 6:
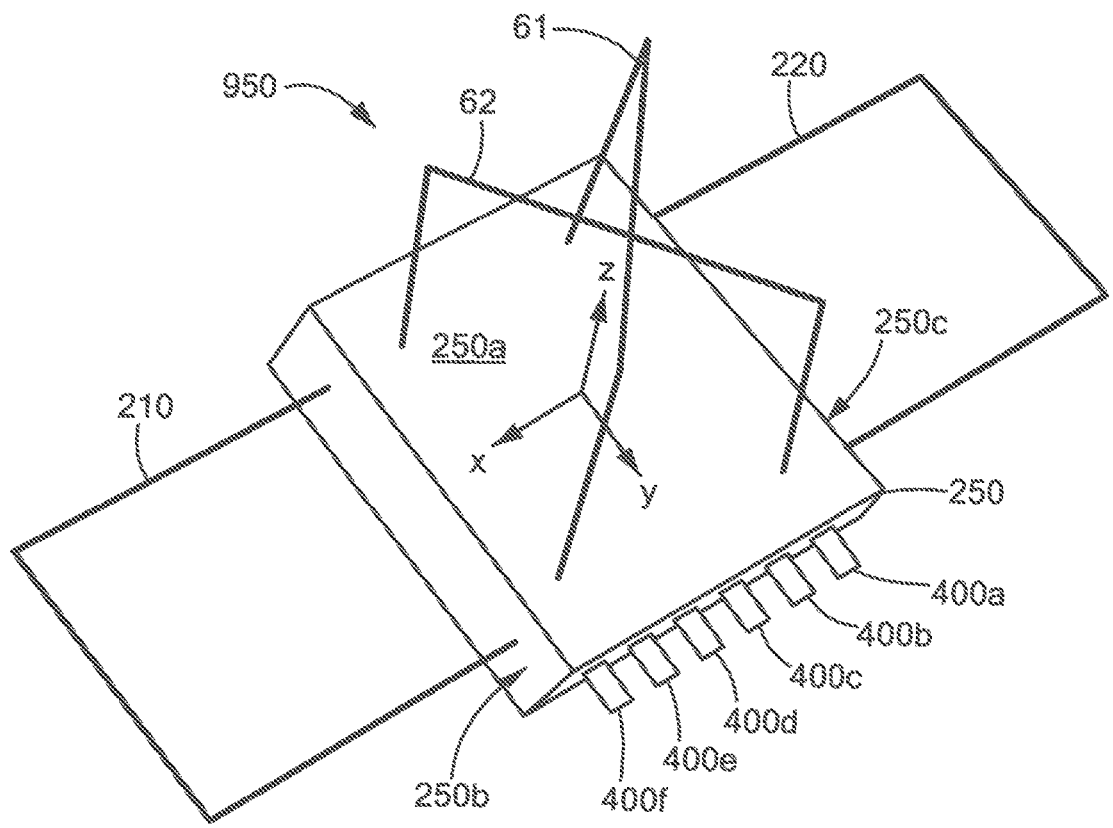
FIG. 6 is an isometric view of a multipolarized vector sensor antenna system having four loop antennas mounted on an electrically conductive housing.

Now referring to FIG. 6, a vector sensor antenna system 950 includes a beamformer 250 having coupled thereto first and second orthogonally disposed loop antennas 61, 62 a third loop antenna 210 and a fourth loop antenna 220. Third and fourth loop antennas 210, 220 are disposed in a plane which is perpendicular to the planes in which antennas 61, 62 lie at an angle of +45 degrees or -45 degrees. The first and second loop antennas 61, 62 are disposed above a first conductive surface 250a of beamformer 250 (or more particularly above a conductive surface of a beamformer housing having a beamformer circuit disposed within). The beamforming circuit is thus configured to accept inputs from four (4) loop antennas. In an embodiment, each of the first and second loop antennas 61, 62 may extend vertically with respect to the first surface 250a. The third loop antenna 210 projects from a first conductive side surface 250b of the beamformer 250 and the fourth loop antenna 220 projects from a second conductive side surface 250c of the beamformer 250. Thus, in the illustrative embodiment of FIG. 6, antennas 61, 62 can be said to be in vertical planes above housing surface 250a while antennas 210, 220 can be said to be in horizontal or parallel planes relative to surface 250a.

Each of the third and fourth loop antennas 210, 220 may extend horizontally relative to the respective side 250b, 250c. The beamformer 250 may include a plurality of beamformer output ports 400a-400f disposed on a third side of beamformer 250. The beamformer ports 400a-400f are here shown coupled to suitable connectors so as to facilitate a connection to a circuit component, such as receiver 70 of FIG. 1 or receiver system 1300 of FIG. 10.

The illustrative vector sensor antenna system 950 of FIG. 6 may be configured to generate at least six vector sensor modes. In some embodiments, the number of connectors 400a-400f may correspond to the number of modes the vector sensor antenna system 950 is configured to generate (e.g., here six). Each loop antenna 61, 62, 210, 220 is preferably disposed above a ground plane with portions of the beamformer housing here serving as a ground plane for the antennas 61, 62, 210, 220. The first and second loop antennas 61, 62 (i.e., vertical loops) and the corresponding vector sensor beamformer may be the same as or substantially similar to the loop antennas 61, 62 and beamformer 700 described herein in conjunction with FIGS. 3-8. In an embodiment, the first and second loop antennas 61, 62 may provide a monopole mode and two orthogonal loop modes.

Similarly, the third and fourth wire loop antennas 210, 220 (i.e., horizontal loops) may provide three modes; a horizontal loop mode and two dipole modes. Thus, the vector sensor antenna 920 may provide up to six vector sensor electric current modes.

Figure 6A:
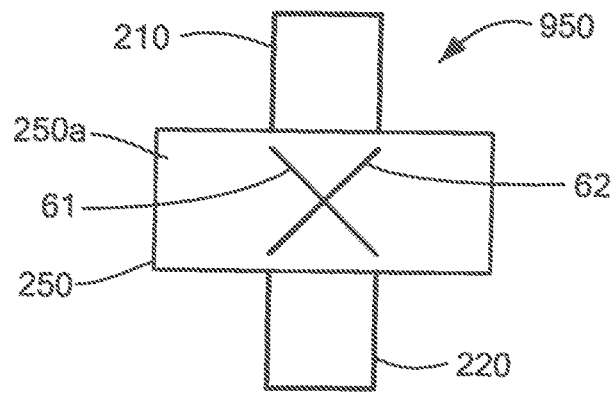
FIG. 6A is a top view of the multipolarized vector sensor antenna system of FIG. 6.
Figure 7A:
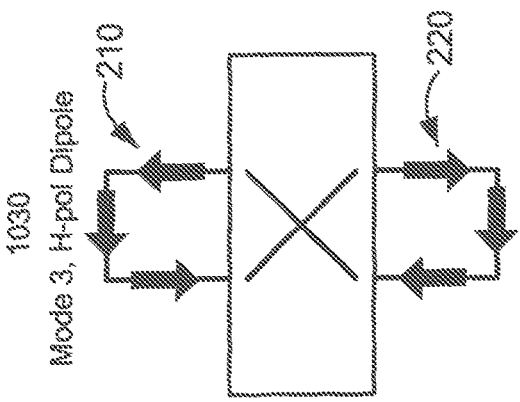
FIGS. 7-7E are a series of schematic diagrams illustrating six vector sensor current modes.
Figure 7D:
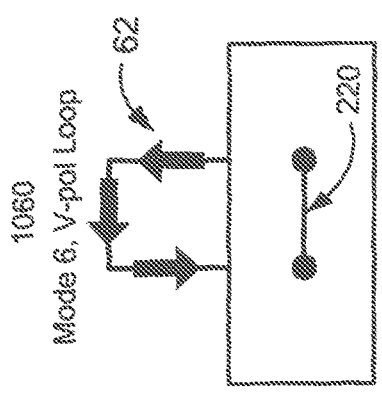
Figure 7B:
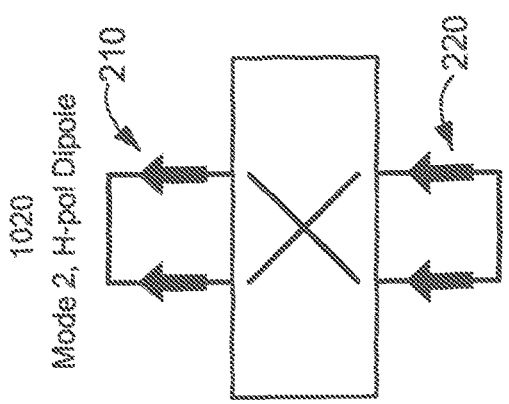
Figure 7E:
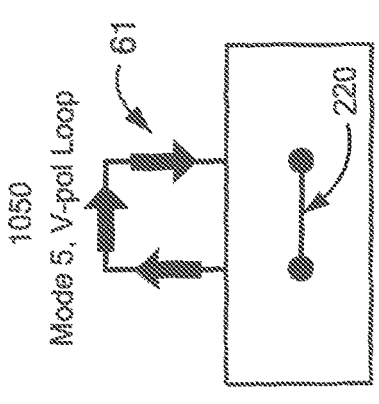
Figure 7C:
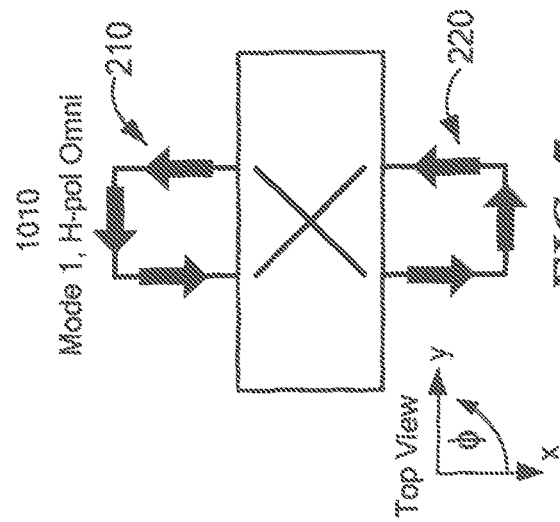
Figure 7C:
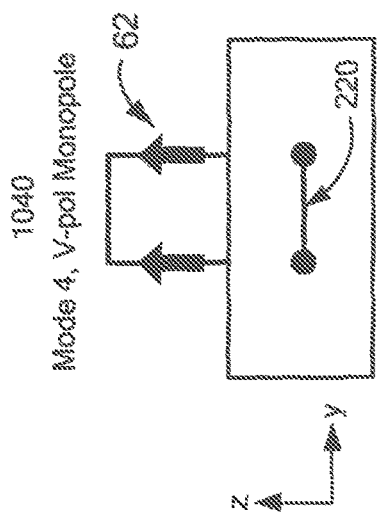

For example and referring to FIGS. 7-7E, six vector sensor electric current modes 1010 (FIG. 7), 1020 (FIG. 7A), 1030 (FIG. 7B), 1040 (FIG. 7C), 1050 (FIG. 7D), 1060 (FIG. 7E) are depicted. The six modes correspond to the modes generated by vector sensor antenna system 950 of FIGS. 6 and 6A. Each of the six vector sensor electric current modes 1010, 1020, 1030, 1040, 1050, 1060 illustrates a flow of current in corresponding ones of the loop antennas in response to an incoming RF signal, for example in the illustrative embodiment of FIG. 7, for example, a first mode 1010 is a horizontally polarized omnidirectional mode, a second mode 1020 is a horizontally polarized dipole along the x-axis, and a third mode 1030 is a horizontally polarized dipole along the y-axis. Further, a fourth mode 1040 is a vertically polarized monopole along the z-axis, a fifth mode is a vertically polarized loop (e.g., wire loop antennas 61, 61 of FIG. 2) in the $\phi=45°$ plane, and a sixth mode 1060 is a vertically polarized loop (e.g., wire loop antenna 62 of FIG. 3) in the $\phi=135°$ plane.

Figure 8:
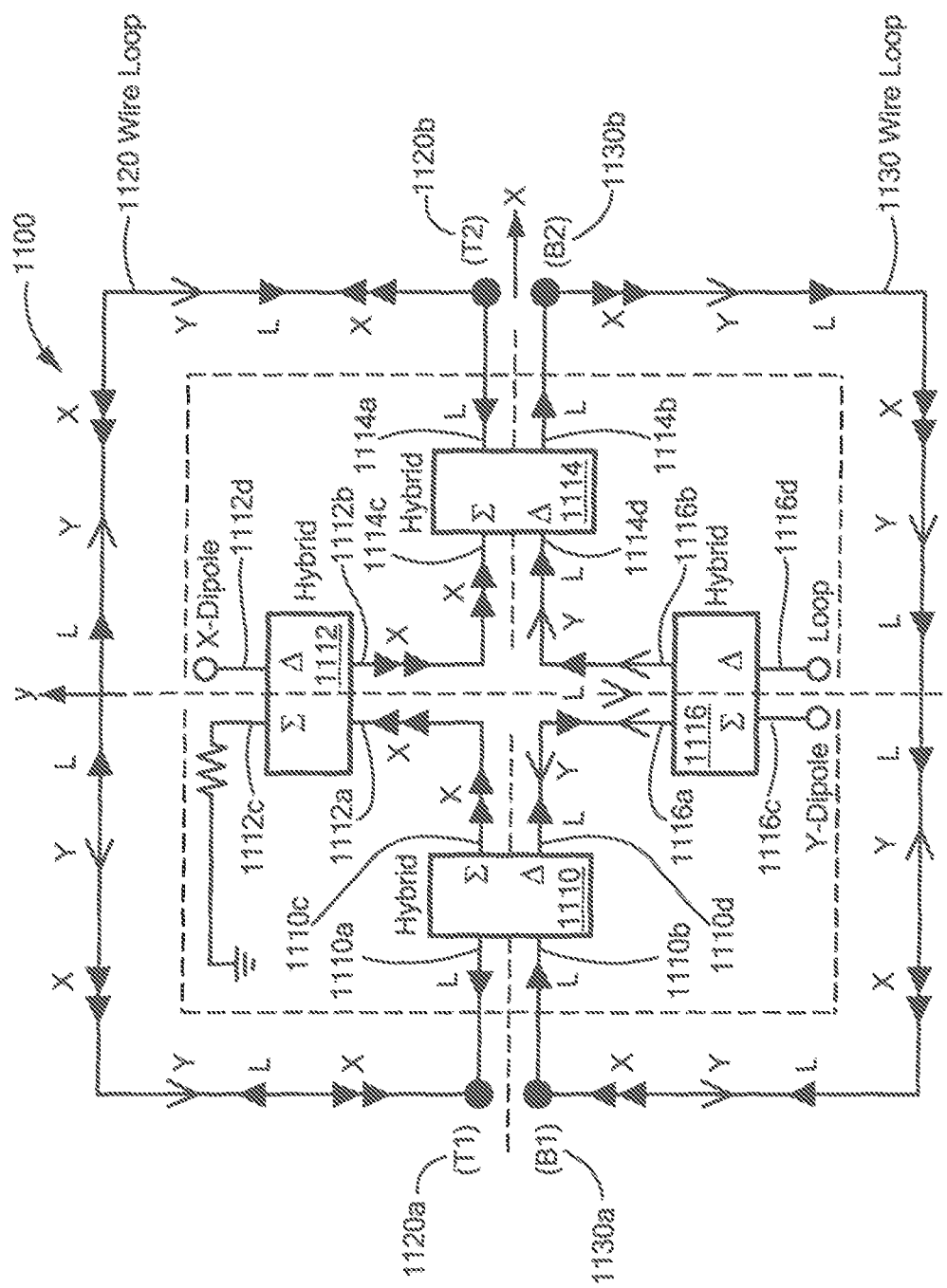
FIG. 8 is a schematic diagram of a vector sensor beamformer illustrating two orthogonal dipole modes and a loop mode.

Now referring to FIG. 8, a three-mode vector sensor beamformer 1100 includes four couplers 1110-1116. In an embodiment, the four couplers 1110-1116 may each be provided as hybrid magic tees. Other components (or a combination of components) may, of course, also be used provided that such components (or combination of components) provide the same functionality as the hybrid magic tee couplers described herein. A first end 1120a of a first loop antenna 1120 is coupled to a first input 1110a of hybrid coupler 1110 and a second of 1120b of loop antenna 1120 is coupled to a first input 1114a of a second hybrid coupler 1114. A first end 1130a of a second loop antenna 1130 is coupled to a second input 1110b of coupler 1110 and a second end 1130*b* of the second loop antenna is coupled to a second input 1114*b* of coupler 1114. The first and second loop antennas 1120, 1130 may be the same or similar to the third and fourth wire loop antennas 210, 220 (i.e., horizontal loops) described above with respect to FIG. 7.

The beamformer magic tee couplers 1110-1116 may be configured to generate at least three modes (i.e., three vector sensor beamformer modes). In the illustrative embodiment of FIG. 8, for example, a first mode corresponding to an omnidirectional loop mode is provided at port 1116*d* of coupler 1116, a second mode corresponding to an y-directed dipole mode is provided at port 1116*c* of coupler 1116, and a third mode corresponding to a x-directed dipole mode is provided at port 1112*d* of coupler 1112.

Figure 9A:
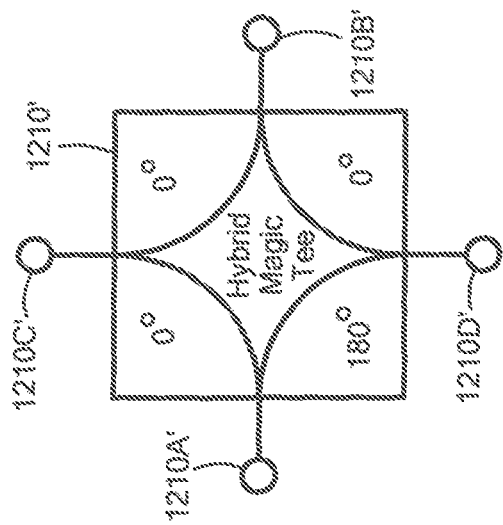
FIG. 9A is a schematic diagram illustrating a phase relationship between ports of a magic tee component.
Figure 9:
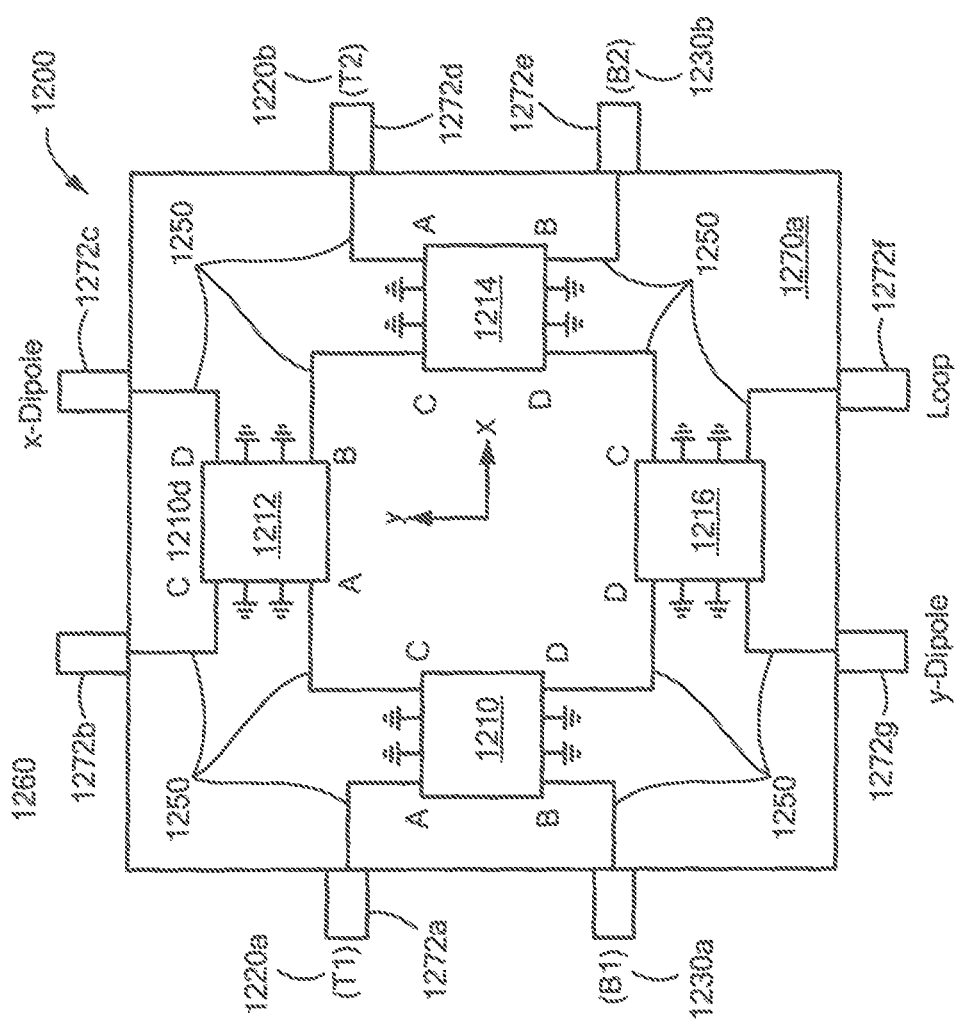
FIG. 9 is a printed circuit board layout for a vector sensor beamformer with two orthogonal dipole modes and a loop mode.

Now referring to FIG. 9, a beamformer 1200 is shows implemented using microstrip printed circuit technology, surface mount components and edge mount connectors. It should, of course, be appreciated that the beamformer and DF concepts described herein may be implemented using a variety of different technologies including, but not limited to any printed circuit implementations (e.g. stripline, coplanar waveguide), so-called chip and wire technologies, or using monolithic microwave integrated circuit (MMIC) technologies. In this particular example, a plurality of surface mount hybrid magic tees 1210-1216 are disposed on a first surface 1270*a* of a printed board 1270. A plurality of microstrip transmission lines 1250 are also disposed on the first surface of printed circuit board 1270 to provide signal paths between certain ports of the couplers 1210-1216 as well as between certain coupler ports and desired ones of connectors 1272*a*-1272*g* which may be provided, for example, as edge mount RF connectors.

In the illustrative embodiment of FIG. 9, beamformer 1200 includes four couplets 1210-1216. Ends 1220*a*, 1220*b* of a first wire loop antenna are coupled to ports 1210*a*, 1214*a* of couples 1210, 1214 and ends 1230*a*, 1230*b* of a second wire loop antenna are coupled to ports 1210*b*, 1214*b* of couplers 1210, 1214.

Microstrip printed circuit lines 1250 couple the ends 1220*a*-1220*b*, 1230*a*-1230*b* to appropriate ports of couplers 1210, 1214. Microstrip antenna transmission lines also provide signals paths between the coupler ports to form the omnidirectional loop mode as well as the x- and y-oriented dipole modes. Beamformer 1200 may the same as or substantially similar to the beamformer 1100 described above with respect to FIG. 8.

It should be appreciated that although in this illustrative embodiment the couplers 1210-1216 are provided as hybrid magic tee couplers, any circuit component (or combination or circuit components) which provide the same function as a hybrid magic tee coupler may, of course, also be used. Ports of couplers 1210-1216 are designated as A, B, C, and D.

Briefly referring to FIG. 9A, one embodiment of a hybrid magic tee coupler 1210' is shown. In hybrid magic tee coupler 1210', port 1210*c'* and port 1210*d'* are 180° out of phase. Port 1210*c'* provides the sum of the signals received at ports 1210*a'* and 1210*b'*, that is, C=A+B. Port 1210*d'* provides the difference between signals received at ports 1210*a'* and 1210*b'*, that is, D=B−A.

Thus, a received RF signal may be coupled from antennas (e.g. via the ends 1220*a*-1220*b*, 1230*a*-1230*b*) to the couplers 1210-1216. The couplers 1210-1216 are arranged and coupled together in such a way to generate the omnidirectional loop mode and the x- and y-oriented dipole modes. Such modal signals may then be transmitted to a receiver system (not shown in FIG. 9). In some embodiments, the beamformer post 1260 is terminated with an impedance matched load (e.g. a 50 ohm resistive load in a system having a 50 ohm characteristic impedance).

Figure 10:
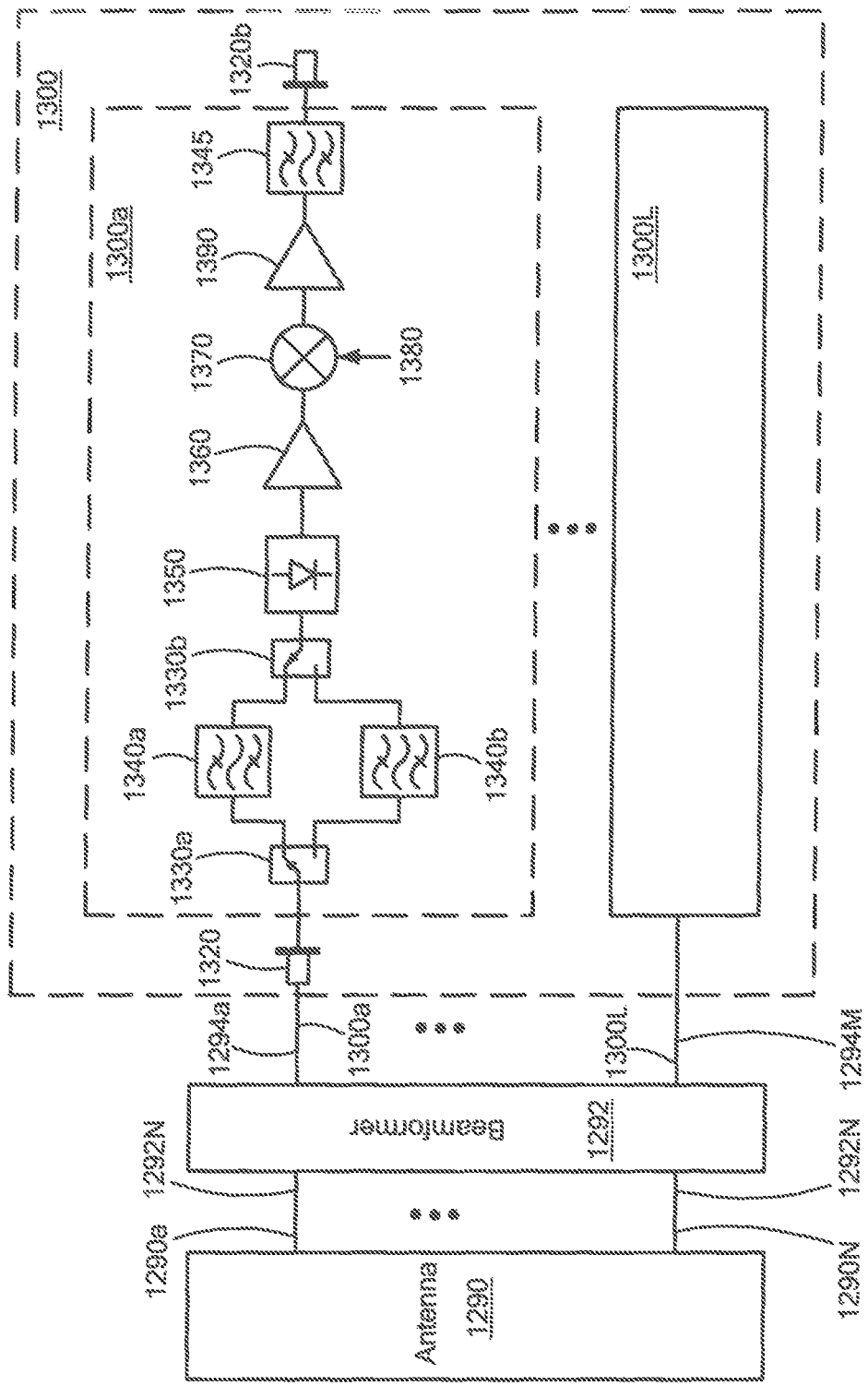
FIG. 10 is a schematic diagram of a dual-band receiver circuit.

Now referring to FIG. 10, a DF system includes an antenna 1290 (which may correspond to a array of antennas such as any of the types described above in conjunction with FIGS. 1-9) having a plurality of antenna ports 1290A-1290N coupled to a corresponding number of inputs 1292A-1292N of a beamformer circuit 1292. Beamformer 1292 operates on the signals provided thereto from antenna 1290 in the same manner as the beamformers described above in conjunction with FIGS. 1-9 to produce one or more modal signals at beamformer output ports 1292A-1294M. Some or all of beamformer port 1292A-1292M are coupled to a corresponding one of a receiver channels 1300A-1300L. Thus, in this illustrative embodiment, a receiver 1300 is provided having L receiver channels. Each receiver channel may process one or more modes provided thereto by beamformer 1292.

Taking receiver channel 1300*a* as representative of receiver channels 1300*b*-1300L, beamformer output 1294*a* is coupled to an input of a first RF switch 1330*a* (e.g. through a connector 1320). An output of the first RF switch 1330*a* can be selectively coupled to inputs of either first or second filters 1340*a*, 1304*b*. The first RF switch 1330*a* can be used to select a path through either the first frequency filter 1340*a* or the second frequency filter 1304*b*. In some embodiments, the first frequency filter 1340*a* may allow signals corresponding to a 406 MHz emergency beacon band to propagate therethrough and the second frequency filter 1340*b* may allow signals corresponding to a 121.5 MHz emergency beacon band to propagate therethrough.

Outputs of each of the first and second frequency filters 1340*a*, 1340*b* are coupled to inputs of a second RF switch 1330*b*. An output of the second RF switch 1330*b* is coupled to an input of a microwave diode limiter 1350. In an embodiment, the second RF switch 1330*b*, engaged in combination with the first RF switch 1330*a*, connects the received signal to a path containing the microwave diode limiter 1350. The microwave diode limiter 1250 is configured to protect a low noise amplifier (LNA) 1360 which provides signal gain. Signals passing through the microwave diode limiter 1350 are coupled to an input of LNA 1360. An output of LNA 1360 is coupled to an input of a mixer 1370.

The received signal is then mixed with a local oscillator signal 1380 in the mixer 1370. An output of the mixer 1370 is coupled to an intermediate frequency (IF) amplifier 1390. An output of IF amplifier 1390 is coupled to an IF filter 1345. Thus, the output signal of the mixer 1370 is passed through IF amplifier 1390 and IF filter 1345. An output of IF filter 1345 is coupled to a second microwave connector 1320*b*. The final downconverted signal is provided at the receiver channel output (e.g. at connector 1320*b*). In an embodiment, the receiver response rate can be less than approximately 40 ms.

In some embodiments, the second microwave connector 1320*b* is coupled to a processor or computing device, such as the signal processor computer 80 described above with respect to FIG. 1. The computing device can process the downconverted signal. For example, in one embodiment, the downconverted signal can then be digitized using an analog to digital converter (ADC), and then subsequently the digital data for each of the microwave receiver channels can be processed using covariance matrix based direction finding algorithms in the computer device, and then the emergency beacon coordinates may be displayed on a computer monitor, such as display unit 90 described above with respect to FIG. 1.

In an embodiment, a radio frequency signal covariance matrix R may be computed by taking the frequency average of the digitized received voltages correlated between all pairs of vector sensor antenna modes. In one embodiment, having six vector sensor modes, a matrix R is a six row by six column matrix (i.e. 6×6). Mathematically, in computing the correlation $R_{mn}$ between the mth and nth vector sensor antenna channel voltages $V_m$ and $V_n$ respectively, the frequency average is expressed as the integral over the receive bandwidth of the product of $V_m$ and $V_n^*$ where * means complex conjugate.

Well known direction finding algorithms can then be used in the signal processing computer 80, described above with respect to FIG. 1, to generate the coordinates of an emergency beacon signal.

In an embodiment, the multipolarized vector sensor array antenna systems described herein can generate RF beacon signal coordinates in approximately 45 ms.

Figure 11:
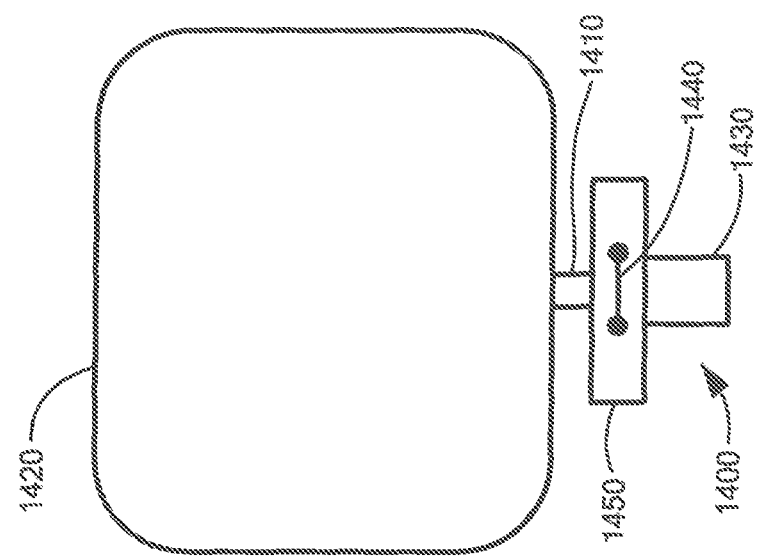
FIG. 11 is a schematic diagram showing the multipolarized vector sensor array antenna connected to the fuselage of an aircraft.

Now referring to FIG. 11, a multipolarized vector sensor array antenna system 1400 is mounted by means of a bracket or mount 1410 to the fuselage 1420 of an aircraft. The array antenna system 1400 includes a housing 1450, vertical wire loop antennas 1430 and horizontal wire loop antennas 1440. The array antenna system 1400 can also be mounted on other structures including ships, towers, ground vehicles, or satellites, and on personnel in backpacks. In some embodiments, to take account of electromagnetic field scattering effects the array antenna system 1400 may be calibrated on a structure such as an aircraft or other platform by using a known radiofrequency transmitting source and measuring the signal of the known source at multiple angles prior to geolocating the unknown location of an emergency beacon signal source. The array antenna system 1400 calibration can be accomplished by electromagnetic simulations and by measurements.

In an embodiment, the multipolarized vector sensor antenna systems described herein provide instantaneous, single look, 2D direction finding capability and accurate geolocation of emergency beacon signals.

Figure 12:
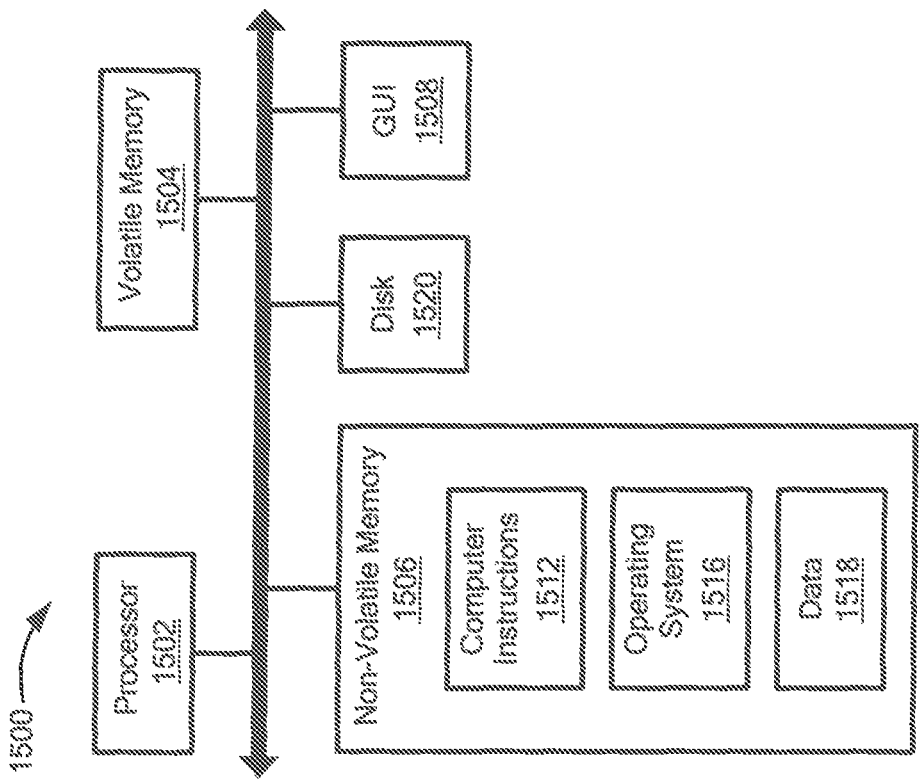
FIG. 12 is a block diagram of an embodiment of a computer system.

Referring to now FIG. 12, a computer 1500 includes a processor 1502, a volatile memory 1504, a non-volatile memory 1506 (e.g., hard disk), a graphical user interface (GUI) 1508 (e.g., a mouse, a keyboard, a display, for example) and a computer disk 1520. The non-volatile memory 1506 stores computer instructions 1512, an operating system 1516 and data 1518 including a plurality of signal levels and corresponding bandwidths and performance thresholds for a phase locked loop, for example. In some embodiments, non-volatile memory 1506 includes a look-up table that stores and organizes data corresponding to the plurality of signal levels and the corresponding bandwidths and performance thresholds for a phase locked loop.

In an embodiment, computer 1500 may be the same as or substantially similar to signal processing system 80 of FIG. 1. Computer 1500 may perform all of the same functions and be configured to receive and generate the same data as signal processing system 80, as described herein. For example, computer 1500 may be configured to receive a digitized signal from a receiver system, such as receiver 70 of FIG. 1 and receiver system 13 of FIG. 10. Further, computer 1500 may be configured to use on-board global positioning system (GPS) and inertial navigation system (INS) data to determine a positon of a beacon that emitted an RF signal. The computer 1500 can be communicatively coupled to a GUI 1508 (e.g., display unit). In an embodiment, the GUI 1508 may be the same or similar to display unit 90 of FIG. 1 and may receive the positon of the beacon and display it to a user, such as on a map to indicate the determined location of the beacon.

The systems and methods described herein are not limited to use with the hardware and software of FIG. 12; they may find applicability in any computing or processing environment and with any type of machine or set of machines that is capable of running a computer program. The systems and methods may be implemented in hardware, software, or a combination of the two. The systems and methods may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform method 200 and to generate output information.

The computer 1500 may be implemented, at least in past, via a computer program product, (e.g., in a machine-readable storage device), for execution by, or to control the operation of data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform methods described herein. The method described herein may also be implemented as a machine-readable storage medium, configured with a computer program, where upon execution, instructions in the computer program cause the computer to operate in accordance with the systems and methods described herein.

The systems and methods may be performed by one or more programmable processors executing one or mote computer programs to perform the functions of the system. All or part of the system may be implemented as, special purpose logic circuitry (e.g., an FPGA (field programmable gate array) and/or an ASIC (application-specific integrated circuit)).

While the concepts, systems and techniques sought to be protected have been particularly shown and described with references to illustrated embodiments thereof, it will be understood by those skilled in the art that various changes in form and details may be made therein without departing from the spirit and scope of the concepts as defined by the appended claims. For instance, the apparatus described herein is applicable from low RF frequencies to high microwave frequencies. Further, the concepts, systems and techniques described herein am applicable to installation on towers, in buildings, and on vehicles such as ground moving vehicles, airborne vehicles, and satellites. Further, the concepts, systems and techniques described herein are applicable to handheld or backpack antenna applications for search and rescue.

Elements of different embodiments described herein may be combined to form other embodiments not specifically set forth above. Other embodiments not specifically described herein are also within the scope of the following claims.

What is claimed is:

1. A direction finding system comprising:
   a ground plane;
   an array antenna comprising four multipolarized loop antenna elements disposed above the ground plane, the four loop antenna elements arranged in three perpendicular planes with two of the antenna elements crossed and the remaining two antenna elements in a plane that is perpendicular to the planes of the crossed elements;
   a beamformer coupled to each of the loop antenna elements and configured to provide at outputs thereof, six orthogonal monopole, dipole, and loop antenna element modes in response to signals provided thereto from at least some of said loop antenna elements; and
   a multi-channel digital receiver system coupled to the beamformer, wherein the multi-channel digital receiver system is configured to receive the beamformer outputs and to determine a two-dimensional geolocation of at least one radio frequency source.

2. The system of claim 1, wherein the beamformer comprises seven hybrid magic tee components that output the monopole, dipole, and loop antenna element modes in response to signals from the loop antenna elements.

3. The system of claim 1, wherein said loop antenna elements are provided as wire loop antenna elements.

4. The system of claim 3, wherein a height of each of the wire loop antenna elements over the ground plane is one-quarter wavelength at a highest operating frequency of the direction finding system.

5. The system of claim 4, wherein each of the wire loop antenna elements has a circular cross section diameter 0.003 wavelengths at a highest operating frequency of the direction finding system.

6. The system of claim 3, wherein each of the wire loop antennas comprise at least one of: a metallic electrical conducting wire, or a rod, or a strip comprising aluminum, or brass, or copper.

7. The system of claim 1, wherein the loop antenna elements are disposed to provide a collocated array of antenna elements having common phase centers.

8. The system of claim 1, wherein the beamformer comprises a printed circuit board, and wherein each of the loop antenna elements is coupled to the printed circuit board using a retainer comprising a conical threaded split ferrule and a compression nut, wherein the compression nut squeezes the split ferrule closed to make both mechanical and electrical contacts to each of the loop antenna elements.

9. The system of claim 1, wherein said digital receiver system is configured to operate over two or more switchable frequency bands.

10. The system of claim 1, wherein the digital receiver system is configured to determine a two-dimensional geolocation of: a 457 kHz avalanche beacon, or a 406 MHz personal locator beacon for land applications, or a 406 MHz Emergency Position Indicating Radio Beacon for marine applications.

11. The system of claim 1, wherein the direction finding system is mounted on: an aircraft fuselage, or a satellite, or a tower, or a building, or a stationary ground vehicle, or a moving ground vehicle, or a ship, or a person's apparel, or a person's accessory.

12. The system of claim 1, wherein the direction finding system is operated to calibrate against scattering from surrounding structures including one or more of: an aircraft, satellite, tower, building, ground vehicle, ship, or backpack.

13. The system of claim 12, wherein the direction finding system is operated to calibrate against scattering by receiving, in each of the loop antenna elements, a signal transmitted by a known radio frequency source and measuring amplitude and phase of the received signal at the loop antenna elements.

14. The system of claim 12, wherein the direction finding system is operated to calibrate against scattering by calculating, using electromagnetic simulations, a signal amplitude and phase of a signal received by each of the loop antenna elements from a known radio frequency source.

* * * * *